United States Patent [19]
Hust et al.

[11] 3,938,183
[45] Feb. 10, 1976

[54] MAGNETIC TAPE SIGNATURE SIGNAL INJECTION DEVICE

[75] Inventors: Donald R. Hust, Camarillo, Calif.; Emory D. Heberling, deceased, late of Riverside, Calif., by Frances L. Herberling, executrix

[73] Assignee: The United States of Amercia as represented by the Secretary of the Navy, Washington, D.C.

[22] Filed: Oct. 3, 1974

[21] Appl. No.: 511,903

[52] U.S. Cl. .................................. 360/31; 360/27
[51] Int. Cl.² ........................................ G11B 27/36
[58] Field of Search ........... 360/31, 27, 55, 65, 137; 324/34

[56] References Cited
UNITED STATES PATENTS

| | | | |
|---|---|---|---|
| 3,031,525 | 11/1962 | Oniki | 360/31 |
| 3,506,814 | 4/1970 | McDonald et al. | 360/31 |
| 3,617,652 | 11/1971 | Krause | 360/31 |

*Primary Examiner*—Vincent P. Canney
*Attorney, Agent, or Firm*—Richard S. Sciascia; Joseph M. St.Amand; Darrell E. Hollis

[57] ABSTRACT

An apparatus for injecting a signature signal on a magnetic tape comprising a signature signal generator connected to a switching system. The switching system connects the signature signal to the recorder inputs while disconnecting the normal recorder inputs. A timer is located in the switching system to permit the injection of the signature signal for a specific time period.

13 Claims, 3 Drawing Figures

CORRECT AZIMUTH
ADJUSTMENT kHz 62.5 | 125.0 | 250.0 | 500.0 | MHz 1.0

SEVERE AZIMUTH
ERROR.

kHz 62.5 | 125.0 | 250.0 | 500.0 | MHz 1.0

MAGNETIC TAPE SIGNATURE SIGNAL INJECTION DEVICE

BACKGROUND OF THE INVENTION

1. Field of the Invention

The present invention relates generally to signature signals for injection onto magnetic tape and more particularly to an apparatus for injecting a signature signal onto a magentic tape.

2. Description of the Prior Art.

Missile test ranges and other facilities involved in magnetic tape recording, reproducing, or dubbing have experienced difficulty in maintaining uniform levels of data quality.

A magnetic tape recorder signature device provides a means of improving the quality of data recovered from magnetic tape recordings. Crossplay, defined as recording on one machine and reproducing on another, has been identified as a major contributor to data degradation. Although less prevalent, data can be degraded when both recording and reproduction is accomplished on the same machine. The principal reasons for this reduction of data quality are: (1) differences in the alignment of record heads and reproduce heads, (2) improper adjustment of the reproduce electronics, and (3) improper adjustment of the record electronics. A magnetic tape recorder signature device provides a swept-frequency signal which may be recorded on any convenient segment of the tape. Upon playback of the tape, this swept-frequency signal or signature signal may be utilized in adjusting the magnetic tape reproducer for optimum performance. The nature of the reproduced signature may also provide information about improper adjustment or malfunction of the record electronics of the machine on which the original recording was made.

The present invention serves as a standard method of assessing the performance of magnetic tape machines and reducing the occasional catastrophic loss of data caused by crossplay problems. At a minimum, tape signatures on prime data recordings would alert station personnel to the need for repair, adjustment, or maintenance during all phases of tape use including original recording, playback and dubbing operations.

The present method of optimizing reproduced data, if it is done at all, consists of one or two different techniques. It is worth noting that neither of these or any other standard method is used to any extent at this time. The two methods or techniques which may be used are referred to as Lissajous-Pattern and White-Noise methods.

The lissajous pattern method requires the use of a sine wave generator and an oscilloscope to accomplish a single objective which is referred to as reproduce head azimuth alignment. The limitations and disadvantages of this method are that external equipment and special setup is required, the frequency to be recorded must be carefully selected and recorded on two different tracks having definite dimensional spacing, and the indicated result reflecting reproduce head azimuth alignment can be deceiving and ambiguous because the same lissajous pattern can result from either the correct or an incorrect azimuth alignment. In addition, this method is time consuming, unreliable, confusing and provides information relative to reproduce head azimuth alignment only. The method is seldom used because of its complexity.

The white noise method requires the use of a noise generator, band limiting filters, and a spectrum analyzer to achieve its goal relative to signature recording. The limitations and disadvantages of this method are that external equipment and setups are required, and a spectrum analyzer is needed which requires more time and effort to operate than a simple oscilloscope display. The method is seldom used because of its complexity.

The potential user of tape signatures may be unnecessarily discouraged by difficult and time-consuming signature recording procedures such as those discussed above. The difficulty of assembling test equipment, changing patch connections, measuring frequencies, and voltages should be eliminated from the procedure. The types of standardized signatures should be limited to one to simplify and minimize the equipment and training requirements.

SUMMARY OF THE INVENTION

The present invention, a magnetic tape, signature-signal, injection device, provides a signature signal generator connected to a switching system that connects the signature signal to the recorder inputs while disconnecting the normal recorder inputs. A timer is located in the switching system to permit the injection of the signature signal on the magnetic tape for a specific time period.

Accordingly, one object of the present invention is to provide a device for injecting a signature signal onto a magnetic tape.

Another object of the present invention is reduce degradation of data.

Another object of the present invention is to maintain uniform levels of data quality.

Another object of the present invention is to reduce crossplay problems.

Another object of the present invention is to provide an automatic injection device.

One other object of the present invention is to reduce complexity and errors in operation.

Other objects and a more complete appreciation of the present invention and its many attendant advantages will develop as the same becomes better understood by reference to the following detailed description when considered in connection with the accompanying drawings in which like reference numerals designate like parts throughout the figures thereof and wherein.

DESCRIPTION OF THE PREFERRED EMBODIMENT

Figure 1:
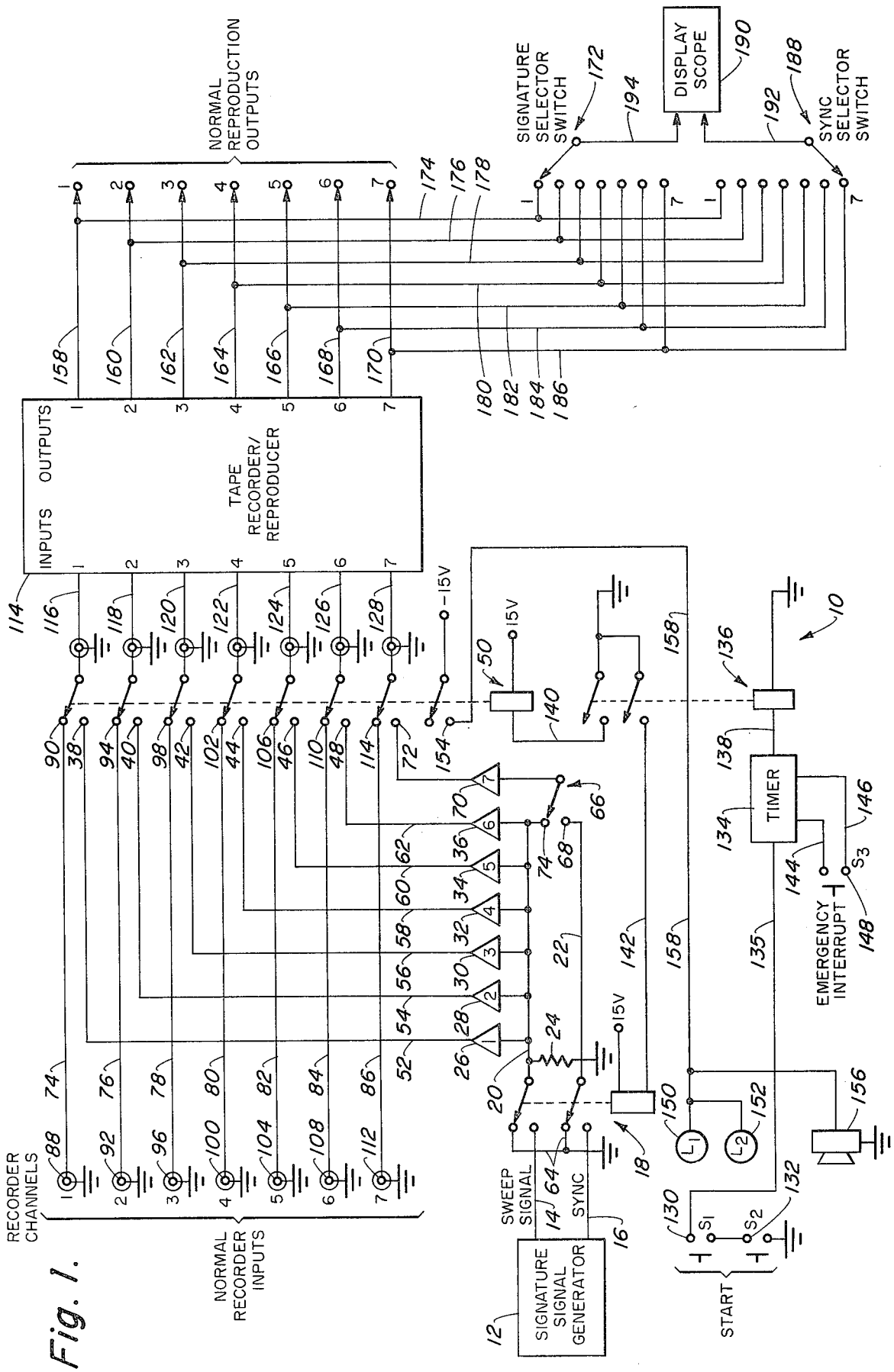
FIG. 1 is a schematic of one embodiment of the present invention.
Figure 2A:
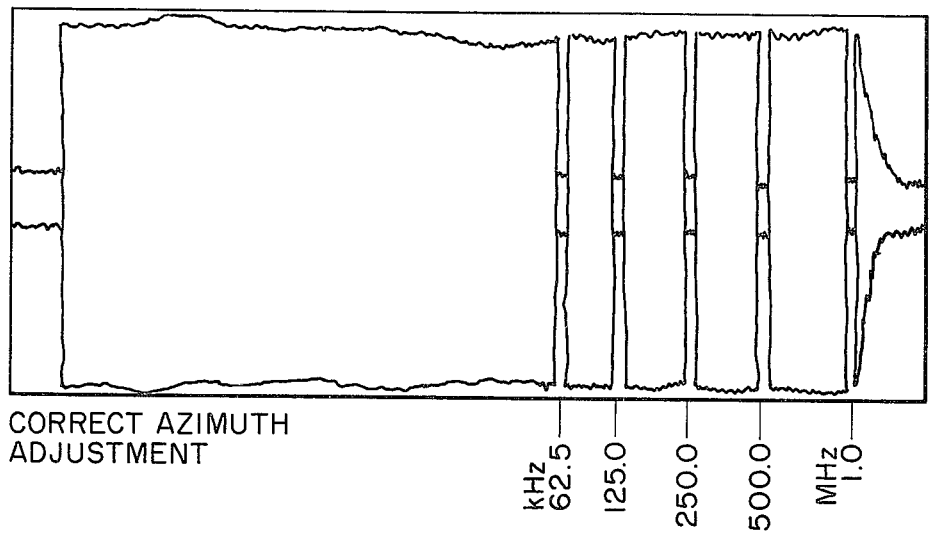
FIGS. 2A and 2B illustrate the reproduction of a recorder sweep signature signal for a 60 inch per second tape speed.
Figure 2B:
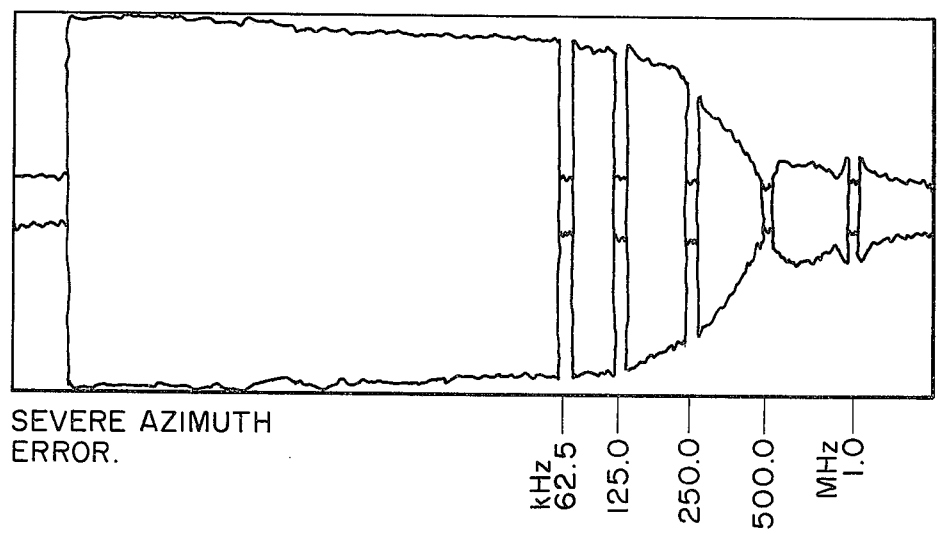

Turning to FIG. 1 an apparatus 10 for injecting a signature signal onto a magnetic tape is illustrated. Signature signal generator 12 outputs a sweep signal on line 14 and a synchronization signal on line 16. The sweep signal maintains a constant amplitude over a frequency range of 400 Hertz through 2.0 megahertz. In addition, the sweep signal contains frequency markers at 62.5, 125, 250, 500, 1000 and 2000 kilohertz. The sweep rate is approximately 25 Hertz. These frequency markers are illustrated in FIG. 2. The synchronization signal in a pulse outputed each time generator 12 outputs a new sweep signal, i.e., every time generator 12's output goes from 2.0 megahertz to 400 Hertz. Generator 12 is a commerically obtainable device common in the art.

Generator 12 is connected to solenoid switch 18 which when closed, i.e., energized, connects line 14 to line 20 and line 16 to line 22. A load resistor 24 is connected between line 20 and ground. Line 20 inputs drivers 26, 28, 30, 32, 34 and 36. Drivers 26, 28, 30, 32, 34 and 36 output the signal on line 20 to terminals 38, 40, 42, 44, 46 and 48 of switch 50, respectively, via lines 52, 54, 56, 58, 60 and 62, respectively. When open solenoid switch 18 is connected to ground via line 64.

Line 22 is connected to manual switch 66 at terminal 68. When switched to terminal 68, switch 66 connects line 22 to driver 70 which is connected to terminal 72 of solenoid switch 50. When switched to terminal 74 switch 66 connects line 20 to driver 70. Thus, manual switch 66 determines whether the synchronization signal on line 22 or the sweep signal on line 14 is transmitted to terminal 72.

Recorder channel lines 74, 76, 78, 80, 82, 84 and 86 are connected between input terminal pairs 88 and 90, 92 and 94, 96 and 98, 100 and 102, 104 and 106, 108 and 110, and 112 and 114 respectively. Input terminals 88, 92, 96, 100, 104, 108, and 112 are normal recorder inputs designated channels 1–7 in FIG. 1.

Switch 50 either connects the sweep and synchronization signals on lines 20 and 22 to tape recorder/reproducer 114 or the normal recorder inputs on lines 88, 92, 100, 104, 108 and 112 to tape recorder/reproducer 114 via lines 116, 118, 120, 122, 124, 126, and 128.

Pushbuttons 130 and 132 when depressed ground timer 134 via line 135 thereby triggering timer 134 to energize solenoid switch 136 via line 138 for a time period of thirty seconds. Of course, time periods of different duration may be utilized as long as the time period is sufficiently long to allow the recordation of at least one sweep of the signature signal on the magnetic tape. Again timer 134 is a commercially available unit common to those of average skill in the art. When energized solenoid switch 136 closes thereby energizing or closing solenoid switches 50 and 18 via lines 140 and 142, respectively.

Also, connected to timer 134 via lines 144 and 146 is pushbutton 148. When pushbutton 148 is depressed the thirty second time period of timer 134's duration is cut short thereby instantly opening solenoid switches 18, 50 and 136 the instant pushbutton 148 is depressed.

A pair of light indicators 150 and 152 are connected to terminal 154 of switch 50 as is an aural indicator 156 via line 158. When solenoid switch 50 is energized, i.e. closed, light indicators 150 and 152 and aural indicator 156 are actuated and remain actuated until solenoid switch 50 is opened.

Tape recorder/reproducer 114 outputs its seven channels on lines 158, 160, 162, 164, 166, 168 and 170. Manual signature selector switch 172 is connected to lines 158–170 via lines 174, 176, 178, 180, 182, 184 and 186 as is manual synchronization selector switch 188. Switch 188 inputs oscilloscope 190 via line 192 while switch 172 inputs oscilloscope 190 via line 194. The scope trigger sweep is actuated by the signal on line 192 while the signal on line 194 is displayed on the oscilloscope face.

In summary, the operation of the specific embodiment of FIG. 1 is as follows. When pushbuttons 130 and 132 are depressed, timer 134 is triggered thereby closing solenoid switch 136 for a time period of thirty seconds. Solenoid switch 136 in turn instantly closes solenoid switches 50 and 18 thereby connecting the sweep signature signal and the synchronization signal to inputs 116–128 of tape recorder/reproducer 114. The normal recorder inputs at terminals 88–112 are disconnected from inputs 116–128. At the termination of the thirty second time period or the depression of pushbutton 148, whichever is first in time, solenoid switch 136 opens thereby opening solenoid switches 18 and 50. Thus the normal recorder inputs at terminals 88–112 are connected to inputs 116–128 and the sweep signature signal and the synchronization signal are disconnected from inputs 116–128.

During the time solenoid switch 136 is closed, switch 50 actuates light indicators 150 and 152 as well as aural indicator 156.

Oscilloscope 190 is utilized to observe the reproduced signal.

FIG. 2 illustrates the appearance of sweep signal signatures on oscilloscope 190 which have been reproduced both with correct azimuth alignment of the reproduce heads and incorrect azimuth alignment of the reproduce heads. Assuming that the specification for the tape machine requires frequency response up to 1 MHz, it is evident that misalignment of head azimuth could have catastrophic effects on data quality because of inadequate frequency response.

When the magnetic tape is reproduced, the display of the signature signal serves as a convenient and unambiguous indicator which may be used during azimuth of the reproduce heads. Such azimuth alignment is often required to properly position the reproduce heads over the recorded tracks on the tape. If it is required, the signature signal may also be utilized during adjustment of the reproduce electronics for best frequency response. In addition, observation of the signature signal may provide information regarding the condition of the record electronics in the original recording machine.

It will be appreciated by those of ordinary skill in the art that the complete circuit diagram of FIG. 1 includes such suitable and necessary biasing voltage sources as are usually provided in such circuits. Such biasing is not shown in FIG. 1.

Obviously, numerous modifications and variations of the present invention are possible in light of the above teachings. It is therefore to be understood that within the scope of the appended claims the invention may be practiced otherwise than as specifically described herein.

What is claimed is:

1. An apparatus for injecting a signature signal onto a magnetic tape comprising:
   a. means for generating a signature signal having an output upon which said signature signal appears;
   b. a plurality of magnetic tape recorder channel input lines one each connected between one pair each of a plurality of first and second recorder inputs;
   c. switching means for connecting said signature signal generating means output to one one of said plurality of second recorder inputs and disconnecting said plurality of channel input lines from said plurality of second recorder inputs; and
   d. timing means communicating with said switching means for allowing said switching means to inject said signature signal and disconnect said channel inputs for a specific time period.

2. The apparatus of claim 1 wherein the duration of said specific time period is thirty seconds.

3. The apparatus of claim 1 wherein said switching means further comprises:
   a. a first solenoid switch being connected to said timing means, said first solenoid switch being closed during said specific time period of said timing means;
   b. a second solenoid switch being connected to said first solenoid switch for connecting said signature signal generating means output to each one of said plurality of second recorder inputs when closed, said second solenoid switch being closed when said first solenoid switch is closed;
   c. a third solenoid switch being connected to said first solenoid switch for disconnecting said plurality of channel input lines from said plurality of second recorder inputs when closed, said third solenoid switch being closed.

4. The apparatus of claim 1 wherein said switching means further includes a visual and an aural indicator communicating with said timing means, said indicators being actuated during the entire duration of said specific time period.

5. The apparatus of claim 1 wherein said switching means further includes interrupt means connected to said timing means for terminating said specific time period prior to its normal duration.

6. The apparatus of claim 1 wherein the duration of said specific time period is thirty seconds.

7. The apparatus of claim 1 wherein said signature signal includes a sweep signal maintaining a constant amplitude over a swept frequency range of from four-hundred Hertz through two megaHertz, said signature signal containing frequency markers at 62½ kiloHertz, 125 kiloHertz, 250 kiloHertz, 500 kiloHertz, 1000 kiloHertz, and 2000 kiloHertz.

8. The apparatus of claim 1 wherein said switching means further includes a visual and an aural indicator communicating with said timing means, said indicator being actuated during the entire duration of said specific time period.

9. The apparatus of claim 1 wherein said switching means further includes interrupt means connected to said timing means for terminating said specific time period prior to its normal duration.

10. The apparatus of claim 1 wherein said signature signal includes a sweep signal maintaining at a constant amplitude over a swept frequency range of from four-hundred Hertz through two megaHertz, said signature signal containing frequency markers at 62½ kiloHertz, 125 kiloHertz, 250 kiloHertz, 500 kiloHertz, 1,000 kiloHertz, and 2,000 kiloHertz.

11. An apparatus for injecting a signature signal onto a magnetic tape comprising:
   a. means for generating a signature signal and a synchronization signal having a first output upon which said signature signal appears and a second output upon which said synchronization signal appears;
   b. a plurality of magnetic tape recorder channel lines one each connected between one pair each of a plurality of first and second recorder inputs;
   c. switching means for connecting said first output of said signature and synchronization signal generating means to all but one of said plurality of second recorder inputs, connecting said second output of said signature and snychronization signal generating means to said remaining second recorder input and disconnecting said plurality of recorder channel lines from said plurality of second recorder inputs.

12. The apparatus of claim 11 wherein said switching means further includes timing means for permiting said switching means to connect said signature and synchronization signal generating means outputs and disconnect said channel input lines for a specific time period.

13. The apparatus of claim 12 wherein said switching means further comprises:
   a. a first solenoid switch being connected to said timing means, said first solenoid switch being closed during said specific time period of said timing means;
   b. a second solenoid switch being connected to said first solenoid switch for connecting said signature and synchronization signal generating means output to said plurality of second recorder inputs when closed, said second solenoid switch being closed when said first solenoid switch is closed;
   c. a third solenoid switch being connected to said first solenoid switch for disconnecting said plurality of channel input lines from said plurality of second recorder inputs when closed, said third solenoid switch being closed when said first solenoid switch is closed.

* * * * *